March 30, 1926.

M. IRELAND

FRICTION WHEEL

Filed Sept. 8, 1920

1,578,525

WITNESSES:

INVENTOR
Morris Ireland
BY
ATTORNEY

Patented Mar. 30, 1926.

1,578,525

UNITED STATES PATENT OFFICE.

MORRIS IRELAND, OF CLEVELAND, OHIO, ASSIGNOR TO WESTINGHOUSE ELECTRIC & MANUFACTURING COMPANY, A CORPORATION OF PENNSYLVANIA.

FRICTION WHEEL.

Application filed September 8, 1920. Serial No. 409,039.

*To all whom it may concern:*

Be it known that I, MORRIS IRELAND, a citizen of the United States, and a resident of Cleveland, in the county of Cuyahoga and State of Ohio, have invented a new and useful Improvement in Friction Wheels, of which the following is a specification.

This invention relates to friction wheels or discs, and, more especially, to a friction wheel which has such improved characteristics as are desirable in articles of this kind.

In friction wheels adapted for various purposes, such as for use in conjunction with small high-speed motors, usually of the series type, for driving of domestic sewing machines, the motor is generally connected to the sewing machine by means of a friction wheel or pinion in contact with the hand wheel. Such wheels should be noiseless, have a high coefficient of friction to transmit power effectively, be tough to insure long life and of uniform texture to prevent wearing out of shape, it being among the objects of this invention to produce a wheel having all these desirable characteristics to a high degree.

Many attempts have been made to produce a wheel having the above-mentioned characteristics but such efforts have hitherto not been completely successful. In fact, the limiting feature of the type of drive above described has been the unsatisfactory friction wheel which has, of necessity, been used heretofore. Wheels of this character have been made from pure cork or from cork and a binder which were fairly good, in that they had a high coefficient of friction and were comparatively noiseless, but such devices did not wear well. Friction wheels have also been made from paper, cardboard, or duck, held between metal flanges. These wheels were disadvantageous in that they were relatively expensive and quite noisy. Wheels made of cork with a binder of a phenolic condensation product were fairly successful but were inclined to be noisy if made dense enough to wear well, and the coefficient of friction thereof was rather low.

In carrying the objects of this invention into effect, I provide a friction wheel comprising, primarily, a rubbery leather material, such as the material known as textan, neolin, rhinohide, or others commonly used for the soles of shoes. Such rubbery leather material comprises a small amount of rubber, fibrous filler, and other substances. By special treatment, this material is made very tough and resilient. Such a friction wheel has about twice the coefficient of friction of any wheel previously used for this purpose.

Figure 1:
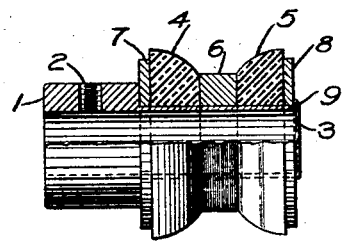
Figure 2:
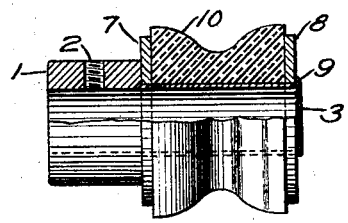
Figure 3:
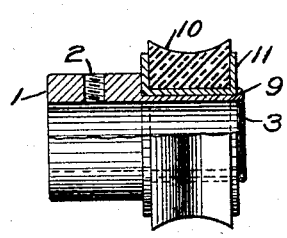
Figure 4:
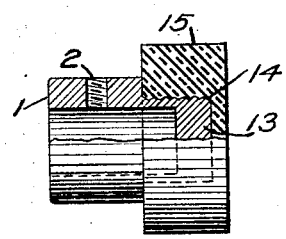

Referring to the accompanying drawings, forming a part hereof, Fig. 1 is a view, partially in section, of one form of friction wheel made in accordance with my invention; Figs. 2 and 3 slightly modified forms of the friction wheel shown in Fig. 1; Fig. 4 a somewhat different form of friction wheel, and Fig. 5 a view of the hub of the friction wheel shown in Fig. 4.

In the form of wheel shown in Fig. 1, the hub 1 has a tapped opening 2 which is adapted to receive a set screw to secure the friction wheel to the shaft of the driving motor (not shown). An extension 3 of the hub 1 has placed thereon discs 4 and 5 of rubbery leather material, such as textan, etc., and a spacer 6, usually of metal, placed therebetween.

End plates 7 and 8 are placed on the outer sides of friction discs 4 and 5, and the extreme end 9 of extension 3 of the hub is upset to permanently secure the friction wheel structure in place on the hub.

Fig. 2 shows a slightly modified form of friction wheel in which the spacer 6 is omitted and the wearing surface 10, of rubbery leather material, is made in a single piece, whereas, in the embodiment shown in Fig. 1, the wearing surface comprises two independent discs 4 and 5.

In the modification shown in Fig. 3, the hub 1 is formed with its extension 3, but the friction portion of the wheel is molded into an annular ring 11 which ring is then fitted to the extension 3 of the hub, the extreme end 9 thereof being upset to hold said ring securely in position.

Figure 5:
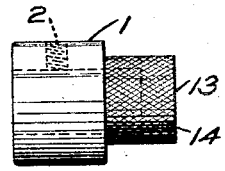

Figs. 4 and 5 show a still further modification of the wheel, the hub 1 being formed with an extension 13, the end of which is closed and the circular portion thereof is formed with knurls 14. The flat friction portion 15 of the wheel, made of rubbery leather material, is molded directly on or cemented to the knurled portion of the hub.

The rubbery leather material may be made of any suitable composition and usually contains a fiber, such as wool, cotton, wood fiber, asbestos, leather, or the like, a filler, such as zinc oxid, litharge, whiting, red lead, etc., sulphur and rubber, the mixture being vulcanized. A composition which is suitable for my purpose consists of rubber 20 parts, shear-flock 10 parts, sulphur 1 part, and litharge 1 part. The ingredients, with the addition of a gritty substance, such as emery, if desired, are thoroughly mixed and then molded and vulcanized under a steam pressure of, for instance, 65 pounds for about twelve minutes.

Although I have described my invention particularly in connection with the several embodiments illustrated in the drawings, my invention is not limited to the forms shown or to the material, such as textan, which is preferably used, but my invention is to be construed broadly, except as limited by the claims appended hereto.

Having thus fully described my said invention, what I claim as new and desire to secure by Letters Patent is:—

1. A friction wheel comprising a wearing portion of rubbery leather material in the form of a pair of discs mounted on a hub, a spacer member between said discs, end plates for said discs, and means for securing the same to said hub.

2. A friction wheel comprising a wearing portion of homogeneous rubbery leather material in the form of a disc molded on a knurled metal hub, and a shoulder on said hub supporting one side of said disc.

In testimony whereof, I have hereunto subscribed my name this 13th day of August, 1920.

MORRIS IRELAND.